March 15, 1927.

D. F. UNRUH

THRASHING MACHINE

Filed June 15, 1925

Inventor
Daniel F. Unruh

By C.A.Snow & Co.
Attorneys.

March 15, 1927.  D. F. UNRUH  1,621,445
THRASHING MACHINE
Filed June 15, 1925   2 Sheets-Sheet 2

Inventor
Daniel F. Unruh

By C A Snow & Co.
Attorneys

Patented Mar. 15, 1927.

1,621,445

UNITED STATES PATENT OFFICE.

DANIEL F. UNRUH, OF GOESSEL, KANSAS, ASSIGNOR OF ONE-HALF TO ED. UNRUH, OF GOESSEL, KANSAS.

THRASHING MACHINE.

Application filed June 15, 1925. Serial No. 37,364.

This invention relates to thrashing machines, one of the objects being to combine with the ordinary thrashing elements a means whereby the separation of the grain from the straw is facilitated.

With the foregoing and other objects in view which will appear as the description proceeds the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
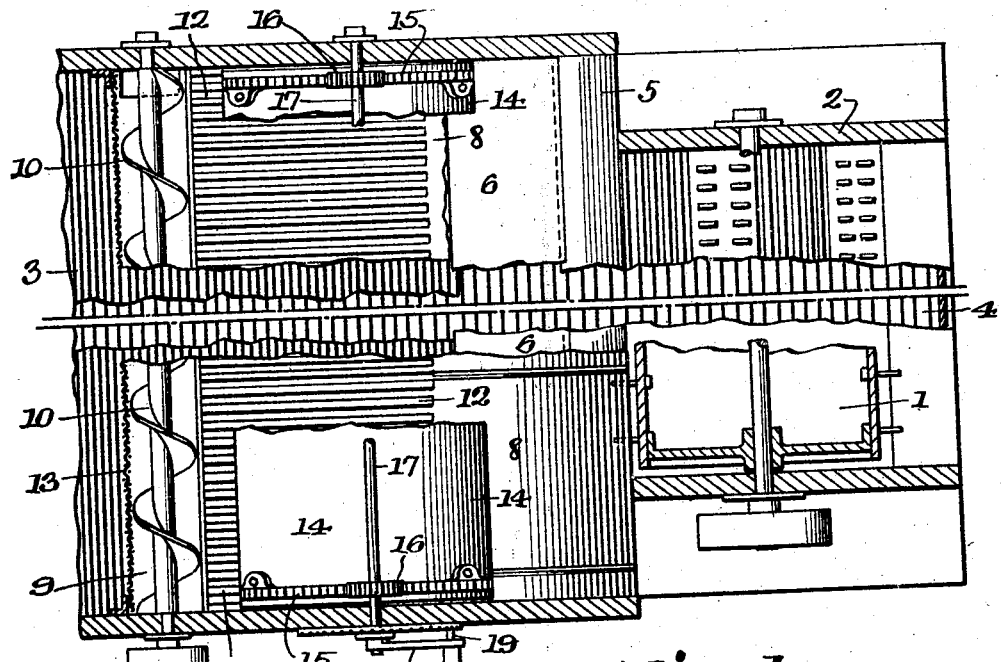
Figure 1 is a view partly in plan and partly in horizontal section of the machine, certain of the parts being broken away.
Figure 2:
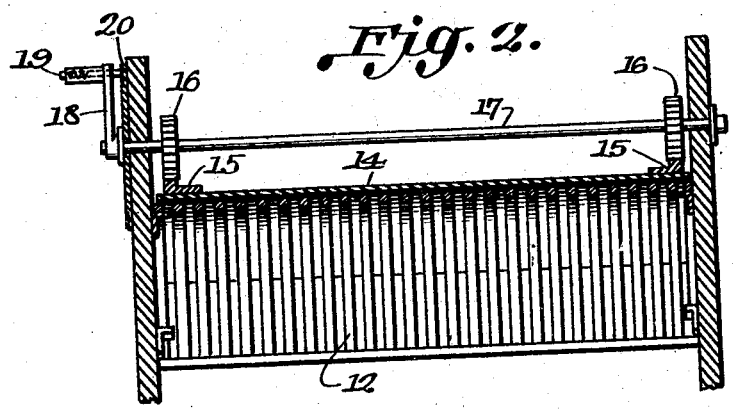
Figure 2 is a vertical transverse section through the deflecting plate and its adjustable cut-off.
Figure 3:
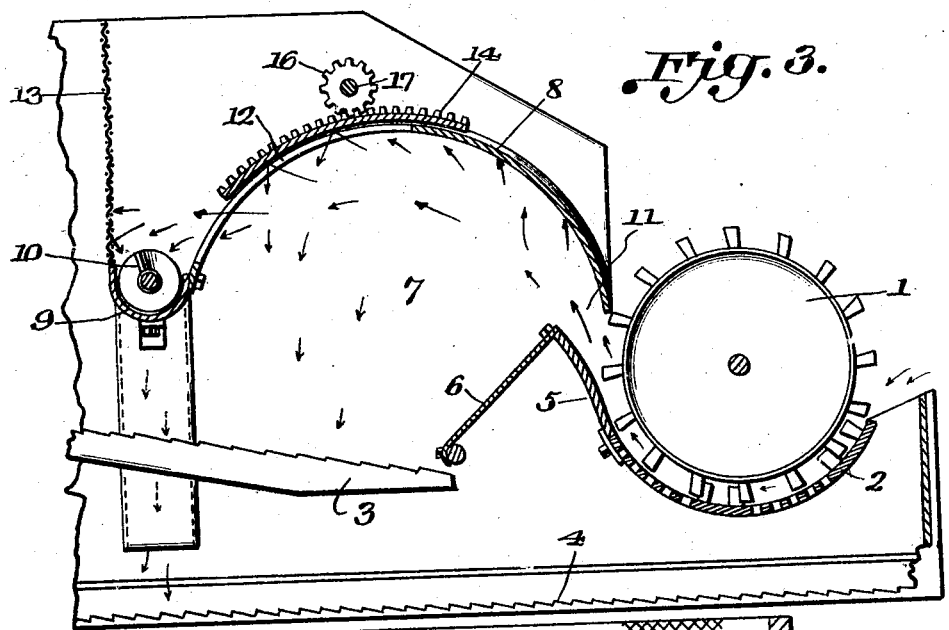
Figure 3 is a vertical longitudinal section through the mechanism.
Figure 4:
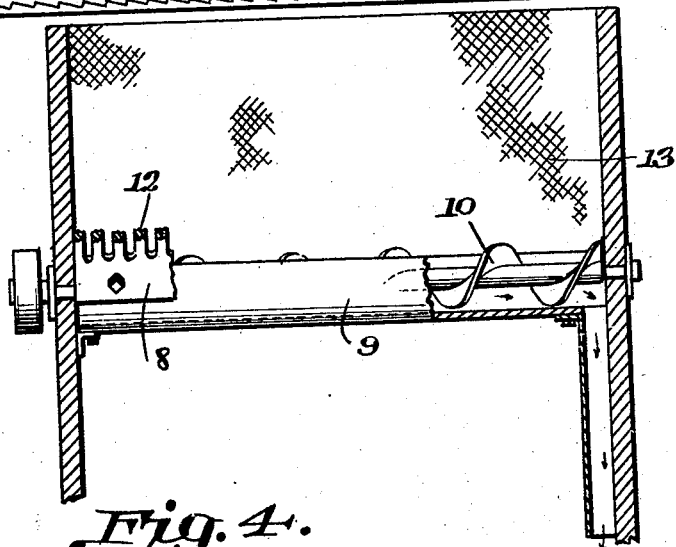
Figure 4 is a transverse section with parts broken away, showing the means for conveying the grain from the machine.

Referring to the figures by characters of reference 1 designates the usual or any preferred thrashing cylinder cooperating with a concave and grate 2. A straw rack has been indicated at 3 and extending under it and the concave is the usual grain pan 4.

The concave and grate 2 is formed, at its delivery end, with an upwardly and forwardly curved extension 5 and located between the free end of this extension and the straw rack 3 is a guard plate 6 inclined, as shown, and designed to prevent straw from dropping onto the grain pan 4 and also to prevent the grain which comes through the extension 5, from falling onto the rack 3.

The space above the rack 3 and the guard plate 6 constitutes a separating chamber 7 the top of which is formed by an arcuate plate 8 extending from a point close to the thrashing cylinder 1 to the trough 9 of a grain delivering screw 10 supported transversely within the machine. One end portion of this arcuate plate 8 cooperates with the extension 5 to form a throat 11 through which the straw and the grain are discharged by the rotating cylinder 1. Approximately one-half of the plate 8 is imperforate but that portion extending up to the trough 9 is slotted longitudinally to form an arcuate grate 12. A screen 13 extends upwardly from the far side of the trough 9 and, if desired, an arcuate cut-off plate 14 can be mounted above the plate 8. This cut-off plate 14 may be formed with racks 15 engaged by gears 16 which are secured to a transverse shaft 17. A crank arm 18 or the like is employed for rotating the shaft and this arm may be provided with any suitable means, such as a spring pressed pin 19 and a notched plate 20 for holding the shaft against accidental rotation.

In using the mechanism herein described the grain is fed to the thrashing mechanism in the ordinary way and is expelled thereby through the throat 11. Some of the grain will of course fall through the concave into the pan 4 but the shield 6 will prevent the straw from falling onto the pan and will also prevent the grain from being thrown forwardly onto the rack 3. The straw, when blown by the cylinder into the separating chamber 7 will travel along the arcuate plate 8 and be deflected downwardly by the bars 12. Finer particles, such as grain and chaff, however, will be expelled through the slots between the bars 12 and will drop into the trough 9, the screen 13 preventing this light material from passing over and beyond the trough. The screw 10 will of course convey from the machine all material accumulating in the trough.

By shifting the plate 14 the point at which the chaff and other light material passes outwardly from the chamber 7 can be varied.

The material delivered by the screw 10 will of course be collected by any suitable means and deposited on the grain pan 4.

What is claimed is:

1. The combination with the cylinder and concave of a thrashing machine, a straw rack positioned to receive straw therefrom, and a grain pan beneath the rack and concave, of an extension at the delivery end of the concave, an arcuate plate above the extension and straw rack and cooperating with said extension to form a delivery throat for straw and grain, that portion of the arcuate plate remote from the concave constituting means for deflecting straw downwardly onto the rack and being formed with openings for the escape of chaff and grain, means beyond the arcuate plate for collecting the accumulated chaff and grain passing through the openings, and means for delivering the collected material.

2. The combination with the cylinder and concave of a thrashing machine, a straw rack positioned to receive straw therefrom, and a grain pan beneath the rack and concave, of an extension at the delivery end of the concave, an arcuate plate above the extension and straw rack and cooperating with said extension to form a delivery throat for straw and grain, that portion of the arcuate plate remote from the concave constituting means for deflecting straw downwardly onto the rack and being formed with openings for the escape of chaff and grain, means beyond the arcuate plate for collecting and delivering the accumulated chaff and grain passing through the openings, said means including a trough, an upstanding screen adjacent the trough and a worm within the trough.

3. The combination with the cylinder and concave of a thrashing machine, a straw rack positioned to receive straw therefrom, and a grain pan beneath the rack and concave, of an extension at the delivery end of the concave, an arcuate plate above the extension and straw rack and cooperating with said extension to form a delivery throat for straw and grain, that portion of the arcuate plate remote from the concave constituting means for deflecting straw downwardly onto the rack and being formed with openings for the escape of chaff and grain, means beyond the arcuate plate for collecting the accumulated chaff and grain passing through the openings, means for delivering the collected material, and adjustable means mounted on the arcuate plate for controlling the flow of material through the opening in the arcuate plate.

In testimony that I claim the foregoing as my own, I have hereto affixed my signature.

DANIEL F. UNRUH.